Patented Dec. 28, 1926.

1,612,255

UNITED STATES PATENT OFFICE.

WILLIAM BORRECA, OF BROOKLYN, NEW YORK.

HAIR LOTION AND METHOD OF PREPARING THE SAME.

No Drawing.   Application filed May 25, 1926.  Serial No. 111,643.

This invention relates to a hair lotion and to a method of preparing the same, and more particularly to a lotion for removing dandruff from the scalp and cleansing and restoring it to an invigorated, healthful condition.

An object of my invention is, accordingly, to provide a lotion having a solvent action on dandruff and at the same time to stimulate the scalp and thus assist mechanically in loosening and dissolving dandruff.

Another object of the invention is to provide a lotion of the type outlined above, having a germicidal or preventive action upon the scalp, acting, upon the removal of the dandruff, to inhibit or prevent the subsequent formation of dandruff, and a further object is to provide a lotion of the type indicated, having a cleansing and softening action on the scalp in addition to the dandruff removing properties.

With these and other objects in view which will appear in the description of the invention, the invention comprises the process described and set forth in the following specification and claims.

In accordance with my invention, I provide in the lotion, a quantity of kerosene or similar mineral oil product into which has been drawn and dissolved those products or extracts of raw or uncooked onions which are soluble in kerosene. This mixture of kerosene and onion extract may be prepared by cutting the onions to a suitable size to permit intimate contact with the kerosene, and then permitting the onions to soak in the kerosene for a substantial period of time, for example about 24 hours. The kerosene may be kept at an ordinary temperature throughout this period. The remaining solid portions of the onions are then removed.

The solution thus obtained has a solvent action on dandruff, and, in addition, has a slightly exciting or stimulating action on the scalp which assists in the solvent action. To this solution there is added a quantity of water and alcohol, or of alcohol of the proper concentration, these ingredients having a cleansing action on the scalp and giving it a refreshed sensation. A quantity of glycerine is also added, having a softening action on the scalp.

The further formation of dandruff on the scalp thus cleansed and freshened, is inhibited by including in the mixture a small quantity of finely divided sulphur.

The disagreeable odor associated with some of the ingredients in the above mixture is masked by a suitable perfume, such as rose oil.

The following is an example of the lotion made in accordance with my invention:

One quarter pound of raw onions, cut into small pieces, is placed in three and three quarter ounces of kerosene and the mixture permitted to stand for about 24 hours. The solids are then removed from the liquid, leaving the kerosene with the substances extracted from the onions. To this solution there is added one and three quarter ounces of water and one and one half ounces of 95% alcohol. In place of these two ingredients added separately, three and one quarter ounces of 44% alcohol may be employed. One half ounce of glycerine and one half ounce of rose oil are added to the mixture to which is also added 40 grains of powdered sulphur. The sulphur is not dissolved to any appreciable extent but remains as a fine suspension. The water, alcohol and glycerine tend to separate from the kerosene, carrying therewith the sulphur. Just prior to using the lotion, it is therefore necessary to shake it vigorously, causing all of the ingredients to be thoroughly mixed for a sufficient period of time to permit its application.

The most beneficial results are obtained when all of the ingredients are present, and particuarly when present in the proportions set forth in the above example. It is of course obvious that, when there is no objection to dispensing with some of the beneficial action of certain of the ingredients, they may be omitted. Thus, where there is no objection to the odor of the active ingredients, the rose oil may be omitted or another perfume substituted in its place. So also, other of the ingredients may be modified in proportion, or dispensed with entirely while still retaining some of the beneficial effects of the remaining ingredients. However, the presence of the kerosene, the extract of the onions and the sulphur are of great importance because they contribute very materially to the elimination of the dandruff already formed and render the scalp receptive to the beneficial action of the other ingredients. With the scalp thus prepared by these ingredients the alcohol and glycerine exert their greatest beneficial action in preserving the healthful condition of the scalp.

As changes of proportion could be made within the scope of my invention, it is intended that all matter contained in the above description shall be interpreted as illustrative and not in a limiting sense.

Having described my invention, what I claim as new and desire to secure by Letters Patent is:

1. A method of preparing a hair lotion which comprises extracting juices from onions by digestion in kerosene at ordinary temperatures, removing the solid residue, adding alcohol and glycerine to the resultant extract, and suspending finely divided sulphur in the resulting mixture.

2. A composition of the type described which comprises kerosene containing an extract of raw onion soluble therein, and finely divided sulphur.

3. A composition of the type described which comprises kerosene, an extract of raw onion soluble therein, finely divided sulphur, and alcohol.

4. A composition of the type described which comprises kerosene, an extract of raw onion soluble therein, finely divided sulphur, alcohol and glycerine.

In testimony whereof I hereunto affix my signature.

WILLIAM BORRECA.